(12) United States Patent
Yuan et al.

(10) Patent No.: US 6,239,619 B1
(45) Date of Patent: *May 29, 2001

(54) METHOD AND APPARATUS FOR DYNAMIC TERMINATION LOGIC OF DATA BUSES

(75) Inventors: Leo Yuan, Los Altos; Chaim Amir, Sunnyvale; Derek Shuntao Tsai; Drew George Doblar, both of San Jose; Jonathan Eric Starr, Cupertino; Trung Thanh Nguyen, San Jose, all of CA (US)

(73) Assignees: Sun Microsystems, Inc., Palo Alto; LSI Logic Corporation, Milpitas, both of CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 46 days.

(21) Appl. No.: 08/763,687

(22) Filed: Dec. 11, 1996

(51) Int. Cl.⁷ .................... H03K 17/16; H03K 19/0175; H03K 19/094
(52) U.S. Cl. .................... 326/86; 326/83; 326/114; 326/30
(58) Field of Search .................... 326/30, 114, 86, 326/58, 83

(56) References Cited

U.S. PATENT DOCUMENTS

| | | | |
|---|---|---|---|
| 4,859,877 | * | 8/1989 | Cooperman et al. .................. 326/30 |
| 5,038,056 | * | 8/1991 | Koide et al. .......................... 326/30 |
| 5,165,046 | | 11/1992 | Hesson ................................. 307/270 |
| 5,218,242 | * | 6/1993 | Imazu et al. .......................... 326/30 |
| 5,239,658 | | 8/1993 | Yamamuro et al. ................. 395/800 |
| 5,311,081 | | 5/1994 | Donaldson et al. ................. 397/475 |
| 5,347,177 | * | 9/1994 | Lipp ....................................... 326/30 |
| 5,463,326 | * | 10/1995 | Raje ...................................... 326/30 |
| 5,514,983 | * | 5/1996 | Yoshino ............................... 326/30 |
| 5,530,377 | * | 6/1996 | Walls .................................... 326/30 |
| 5,621,677 | * | 4/1997 | Jones .................................... 326/114 |
| 5,760,601 | * | 6/1998 | Frankeny .............................. 326/30 |

FOREIGN PATENT DOCUMENTS

| | | | |
|---|---|---|---|
| 358148544 | * | 9/1983 | (JP) ........................................ 326/30 |
| 404094214 | * | 3/1992 | (JP) ........................................ 326/30 |

OTHER PUBLICATIONS

Active Terminators for CMOS Drivers, IBM Technical Disclosure Bulletin, vol. 32, No. 4A, pp. 393–395, Sep. 1989.*

* cited by examiner

*Primary Examiner*—Michael Tokar
*Assistant Examiner*—Daniel D. Chang
(74) *Attorney, Agent, or Firm*—Park & Vaughan LLP

(57) ABSTRACT

An apparatus for dynamic termination logic of bi-directional data buses and methods of operating the same result in bi-directional data buses with improved data transfer performance. The bi-directional data bus for wire-or data transfers comprises a first end-driver coupled to a first end of the data bus configured to drive the first end of the data bus with a first signal. The second end-driver coupled to the second end of the data bus is configured to dynamically terminate the first signal from the first end-driver.

20 Claims, 5 Drawing Sheets

METHOD AND APPARATUS FOR DYNAMIC TERMINATION LOGIC OF DATA BUSES

BACKGROUND OF THE INVENTION

1. Field of the Invention

The present invention relates to data bus transfers and more particularly to dynamic termination logic of data buses to improve performance of the data buses.

2. Description of the Related Arts

As computer technologies continue to grow in leaps and bounds, users of the computer technologies have an insatiable desire for faster systems in ever smaller packages. One area of a system that is often a weak link to an otherwise much faster system is the data bus. The data bus provides transfers of data in the form of electrical signals from one subsystem to another. Often times the data bus of a system gets overwhelmed with data transfers and becomes the bottle neck of the system.

In a high performance bi-directional data bus design, the data transfer bottle neck problem is compounded by multiple devices transferring data on the same data bus and the transfer of data in two directions. Certain functions performed by a computer system such as driving an address bus utilize bi-directional buses. A typical bi-directional bus design has at least two end-drivers, each located to one end of the bi-directional data bus and is configured for wire-oring of data signals on the data bus. In the wire-or configuration, either end-driver is able to drive data signals on the data bus. When the end-drivers are inactive, the data bus is pulled-up to a logic high state, "1". When an end-driver is active and driving the data bus, the data bus is at the logic low level, "0".

As the end-drivers transition between inactive and active states of operation, switching wave signals are generated. If the switching wave signals are not terminated, reflections of the switching wave signals occur that will cause ringing on the data bus. The ringing causes the data signals on the data bus to be unsettled. An unsettled data bus produces unstable data. As the ringing from the reflections eventually settles, the data on the data bus stabilizes to a steady logic. Ringing on the data bus is undesirable because the ringing reduces the speed at which data signals are transferred on the data bus. Time wasted waiting for the data bus to settle from the ringing can be best used for additional data transfers.

Present data bus designs attach a termination resistor at each of the data bus to terminate the switching wave signals. The termination resistors serve a dual purpose of terminating the switching wave signal and providing a pull-up signal to produce a logic high state on the data bus when the end-drivers are inactive. The end-drivers are typically open drain or open collector transistors depending on whether the transistors are formed using CMOS (complementary metal oxide silicon) or bipolar processes. To properly terminate the switching wave signals, the resistive value of the termination resistors are set to the characteristic impedance of the data bus. No reflections occur when the ends of a data bus are properly terminated with termination resistors whose values equal to the characteristic impedance of the data bus.

Take for example the data bus with two end-drivers and two termination resistors attached to the ends of the data bus. When one end-driver becomes active while the other is inactive, a negative switching wave signal (transition from an initial high logic state to a low logic state) generated from the active end-driver travels to the end of the data bus and is terminated without reflections by the termination resistor at the end of the data bus. However, during operations of the data bus there are instances when back to back switching occurs with the end-drivers. Back to back switching occurs when both end-drivers are simultaneously switching between active and inactive states of operation. As one end-driver switches from inactive state to active state, a negative switching wave signal (transition from a high logic state to a low logic state) is generated. As the other end-driver switches from active state to inactive state, a positive switching wave signal (transition from a low logic state to a high logic state) is generated. The negative switching wave signal terminates when it reaches the termination resistor at the end of the data bus, but the positive switching wave signal produces a reflection from the active end-driver which has a resistance other than the characteristic impedance of the data bus. A wire-or glitch results from the reflection of the positive switching wave signal. The wire-or glitch causes ringing on the data bus and produces unsettled data signals on the data bus. Time is wasted waiting for the ringing on the data bus to settle.

Moreover, the data buses are often formed as traces on printed circuit boards which route the data buses to the various circuit components of a sub-system. The printed circuit boards of a computer may include tens of data buses coupling the multitude of the circuit components together. There are also a plurality of mid-drivers in open drain or open collector configurations placed between the end-drivers to provide data bus access for the circuit components of the subsystem. Because termination resistors are placed at the ends of a data bus, present data bus designs attach the resistors externally on the printed circuit board. Valuable areas of the printed circuit board that can be used for additional circuit components and circuitry are wasted.

Therefore, it is desirable to provide an apparatus and methods of operating the same which improve settling time of data buses and eliminate placement of space-wasting external termination resistors on printed circuit boards and other subsystems of a computer system.

SUMMARY OF THE INVENTION

The present invention provides an apparatus for dynamic termination of data buses and methods for operating the same which result in improved settling time of data signals on the data bus. The novel data bus design is based on data bus drivers having dynamic termination logic to improve effectiveness of terminating data signals on a data bus. Thus, according to one aspect of the invention, a bi-directional data bus for wire-or data transfers comprises a first end-driver coupled to a first end of the data bus configured to drive the first end of the data bus with a first signal. A second end-driver coupled to the second end of the data bus is configured to dynamically terminate the first signal from the first end-driver. The second end-driver includes a pull-up transistor with a resistive value of the characteristic impedance of the data bus and a pull-down transistor with a resistive value of the characteristic impedance of the data bus. The termination resistors are integrated with the second end-driver and act to terminate the first signal. Thus, regardless of the state of the second end-driver being active or inactive, a resistive value of the characteristic impedance is coupled to the data bus to terminate the first signal from the first end-driver.

According to another aspect of the invention, the second end-driver drives the data bus with a second signal and the first end-driver dynamically terminates the second signal from the second end-driver. The first end-driver includes a pull-up transistor with a resistive value of the characteristic impedance of the data bus and a pull-down transistor with a resistive value of the characteristic impedance of the data bus. The termination resistors are integrated with the first end-driver. Thus, regardless of the state of the first end-driver being active or inactive, a resistive value of the characteristic impedance is coupled to the data bus to terminate the second signal from the second end-driver.

According to another aspect of the invention, the first end-driver and the second end-driver simultaneously dynamically terminate the first and the second signals. During back to back switching of the first end-driver and the second end-driver which occurs when the end-drivers switch on consecutive synchronous clock cycles, the received first signal at the second end-driver and the received second signal at the first end-driver dynamically terminate with the characteristic impedance of the data bus upon reaching the end-drivers. Regardless of the switching state of the end-drivers, the characteristic impedance of the data bus is coupled to the data bus for proper termination to prevent reflections and thus, settles the data bus to allow other data signals to drive the data bus sooner rather than waiting for reflections from a switching wave signal to settle.

According to yet another aspect of the invention, a first mid-driver coupled to the data bus is configured to drive the data bus with a third signal, and a second mid-driver coupled to the data bus is configured to drive the data bus with a fourth signal. The second end-driver dynamically terminates a reflection of the fourth signal from the first mid-driver, and the first end-driver dynamically terminates a reflection of the third signal from the second mid-driver. Thus, during back to back switching of the mid-drivers, reflections resulting from improper termination of the mid-drivers travel the length of the data bus and terminate at the end-drivers.

An apparatus and method for operating an improved data bus are provided by the dynamic termination logic to terminate data signals on the data bus for improved data bus settling times. Integration of the termination resistors for the data bus with the drivers eliminates the need for external placement of the termination resistors to the printed circuit boards or the like of a computer system. Space savings from eliminating the external resistors affords more space on the printed circuit boards for additional circuit components and circuitry that further enables integration of more functions in even smaller packages. Furthermore, reducing settling time of the data bus affords data bus designs with increased data rates. Increasing the data rates of a computer subsystem increases the speed at which an overall system processes data. Thus, the dynamic termination logic not only increases available space on a printed circuit board but also increases the throughput of a system for performing data transfers.

Other aspects and advantages of the present invention can be seen upon review of the figures, the detailed description, and the claims which follow.

DETAILED DESCRIPTION OF THE INVENTION

Figure 1:
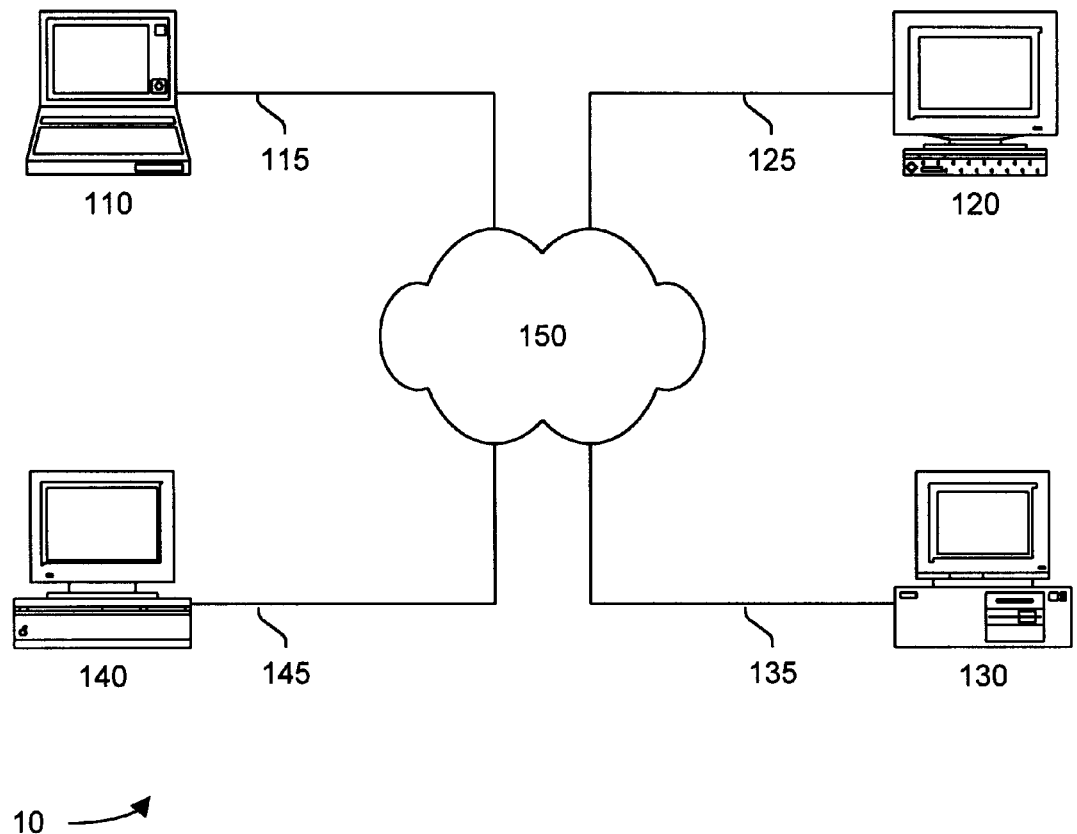
FIG. 1 illustrates a system level block diagram of a computer network having dynamic termination logic of data buses in accordance with the present invention.

The invention will be described with respect to the Figures in which FIG. 1 generally shows a system of a computer network 10. Like numeral designations represent like components throughout the description. The computer network 10 includes a client 110, a client 120, a client 130, a client 140, and an Internet 150. The Internet 150 couples the clients 110, 120, 130, and 140 enables communication between the clients. In accordance with the present invention, the Internet 150 provides TCP/IP (Transmission Control Protocol over Internet Protocol). Other represented segments operating the TCP/IP including intranets and local area networks are also suitable.

Bi-directional data buses 115, 125, 135, and 145 according to the present invention provide dynamic termination logic for improved data bus performance. In FIG. 1, the data buses 115, 125, 135, and 145 provide network connections between the clients 110, 120, 130, and 140 and the Internet 150. Data bus 115 provides a network connection for the client 110 to access the Internet 150. Data bus 125 provides a network connection for the client 120 to access the Internet 150. Data bus 135 provides a network connection for the client 130 to access the Internet 150. Data bus 145 provides a network connection for the client 140 to access to the Internet 150. The clients 110, 120, 130, and 140 include logic circuits that are programmed to perform a series of specifically identified operations for data transfers to and from the Internet 150. The data buses 115, 125, 135, and 145 include logic circuits that provide dynamic termination logic of the data buses. Thus, data transfers between the client 110 and the client 120 occur via the data bus 115, to the Internet 150, to the data bus 125, and to the client 120. Similarly, data transfers between the client 120 and the client 110 occur via the data bus 125, to the Internet 150, to the data bus 115, and to the client 110.

Other variations of data transfers between the clients include coupling a data bus between two clients to facilitate the data transfers. A simpler computer network provides data transfers between two clients via a dynamically terminated data bus. Because internal data transfers also occur within a client, the clients 110, 120, 130, and 140 include dynamically terminated data buses in accordance with the present invention to facilitate the internal data transfers. Thus, the data buses having dynamically terminated logic are included throughout the computer network 10.

Figure 2:
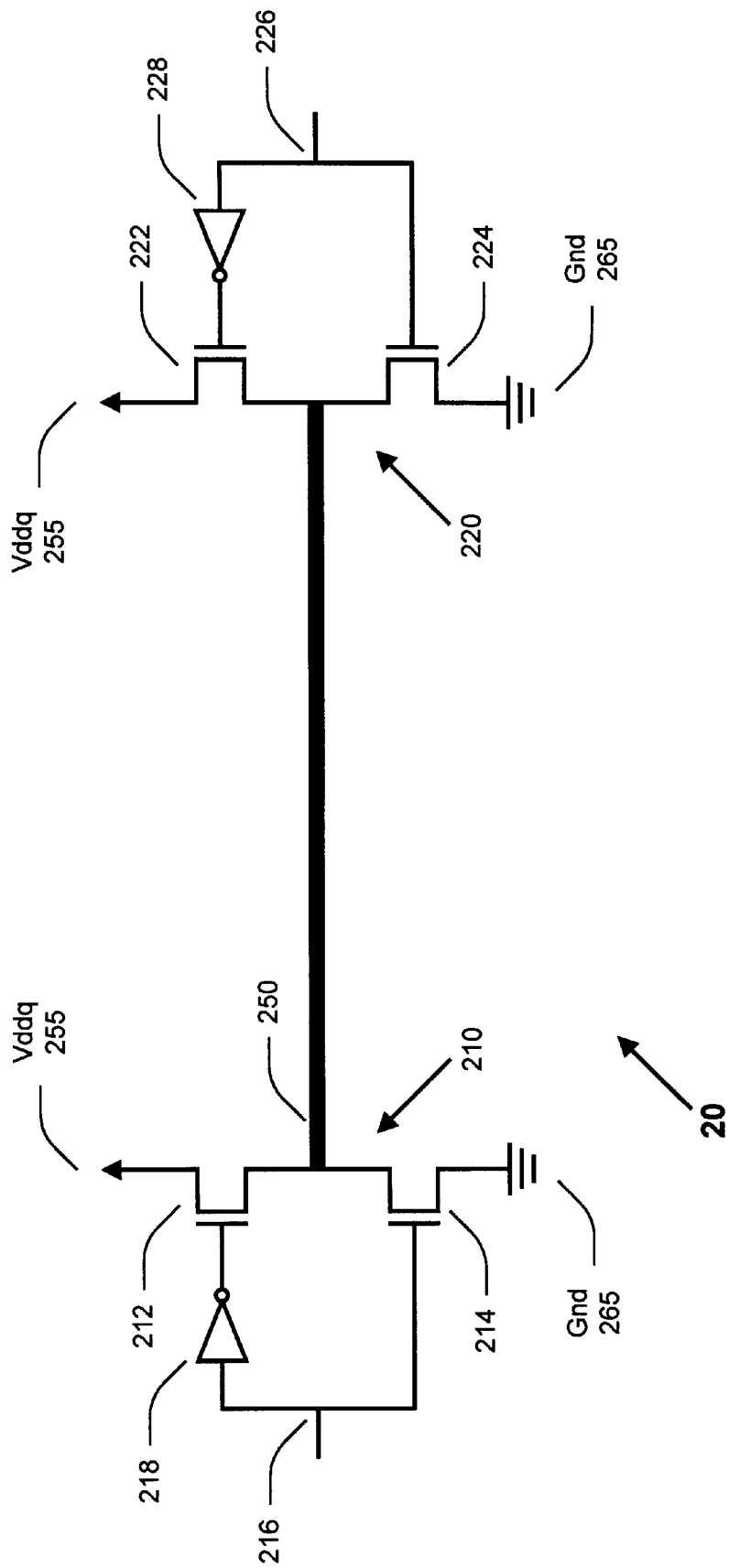
FIG. 2 illustrates a circuit diagram of a data bus having end-drivers in accordance with the present invention.

FIG. 2 shows a circuit diagram of a dynamic termination logic data bus 20 in accordance with the present invention. The dynamic termination logic data bus 20 includes an end-driver 210, an end-driver 220, and a data bus 250 set in a wire-or configuration. The end-driver 210 is coupled to the data bus 250 and provides drive outputs to the data bus 250. Similarly, the end-driver 220 is coupled to the data bus 250 and provides drive outputs to the data bus 250. The drive outputs from the end-drivers 210 and 220 provide switching waves between Vddq voltage and ½ Vddq voltage. The Vddq voltage and the ½ Vddq voltage represent a high logic state, "1" and a low logic state, "0" on the data bus 250, respectively. Although the present invention shows MOS transistors, other variations of transistors may be used. Moreover, because the drivers perform switching functions, other devices that facilitate switching functions may be substituted for the transistors.

The end-driver 210 includes a MOS (Metal Oxide Silicon) transistor 212, a MOS transistor 214, control input 216, and an invertor 218. Drain of transistor 212 is coupled to Vddq 255, and source of transistor 212 is coupled to the data bus 250 and drain of the transistor 214. Source of transistor 214 is coupled to Gnd 265. The output of invertor 218 is coupled to the gate of transistor 212. Control input 216 coupled to the input of the invertor 218 and the gate of transistor 214 provides control signals to activate the end-driver 210. It will be appreciated and the people skilled in the art that the transistor 212 and transistor 214 can be implemented in CMOS (complementary MOS) so that the transistor 212 and invertor 218 become a p-channel transistor and the transistor 214 a n-channel transistor.

The end-driver 220 includes a MOS transistor 222, a MOS transistor 224, control input 226, and invertor 228. Drain of transistor 222 is coupled to Vddq 255, and source of transistor 222 is coupled to the data bus 250 and drain of the transistor 224. Source of transistor 224 is coupled to Gnd 265. The output of the invertor 228 is coupled to the gate of transistor 222. Control input 226 coupled to the input of the invertor 228 and the gate of transistor 224 provides control signals to activate the end-driver 220. Of course, people skilled in the art appreciate that the transistor 222 and invertor 228 become a p-channel transistor and the transistor 224 a n-channel transistor in CMOS implementation.

In order to prevent wire-or glitch, the transistors of the end-drivers 210 and 220 are formed to provide a resistance set to the characteristic impedance of the data bus 250. Thus, when the transistors of the end-drivers activate, the resistance of the activated transistors match the characteristic impedance of the data bus 250. Switching signal waves received at the end-drivers are terminated with the characteristic impedance of the data bus. The present invention provides that the characteristic impedance of the data bus 250 to be 50Ω (ohms) which sets the resistance of an activated transistor of an end-driver to be also 50Ω.

In instances of back to back switching of the end-drivers, the dynamic termination logic data bus 20 terminates the switching signal waves from the end-drivers to prevent reflections onto the data bus 250. To begin, end-driver 210 is initially inactive. The control input 216 provides an input that turns-on transistor 212 and turns-off transistor 214 which couples Vddq 255 to the data bus 250 via transistor 212. End-driver 220 is initially active. The control input 226 provides an input that turns-off transistor 222 and turns-on transistor 224 which couples the data bus 250 to Gnd 265 via transistor 224. Thus, the initial state of the data bus 250 is at a ½ Vddq voltage which corresponds to a low logic state. As a back to back switching occurs, the control input 216 provides an input that activates end-driver 210, and the control input 226 provides an input that deactivates end-driver 220. As the end-driver 210 activates, transistor 212 turns-off and transistor 214 turns-on generating a negative switching wave signal of ½ Vddq voltage to Gnd voltage. About the same instant, as the end-driver 220 deactivates, transistor 222 turns-on and transistor 224 turns-off generating a positive switching wave signal of ½ Vddq voltage to Vddq voltage.

As each switching wave signal travels the length of the data bus 250, each switching wave signal terminates at the end of the data bus 250 with the end-driver. The end-driver 220 receives the negative switching wave signal from the end-driver 210 and terminates the negative switching wave signal because the activated transistor 222 of the end-driver 220 has a resistive value that matches the characteristic impedance of the data bus 250. Similarly, the end-driver 210 receives the positive switching wave signal from the end-driver 220 and terminates the positive switching wave signal because the activated transistor 214 of the end-driver 210 has a resistance that matches the characteristic impedance of the data bus 250. No reflections occur from the back to back switching of the end-drivers. The data bus 250 settles when the wave signals reach the end-drivers. The settling time for the data bus 250 is minimized to zero because there are no reflections on the data bus 250. Minimizing settling time for the data bus 250 affords increases in data bus transfer rates. Thus, the end-driver 210 and the end-driver 220 include dynamic termination logic that dynamically terminates the switching wave signals on the data bus 250 regardless to whether an end-driver is activated or deactivated.

Figure 3:
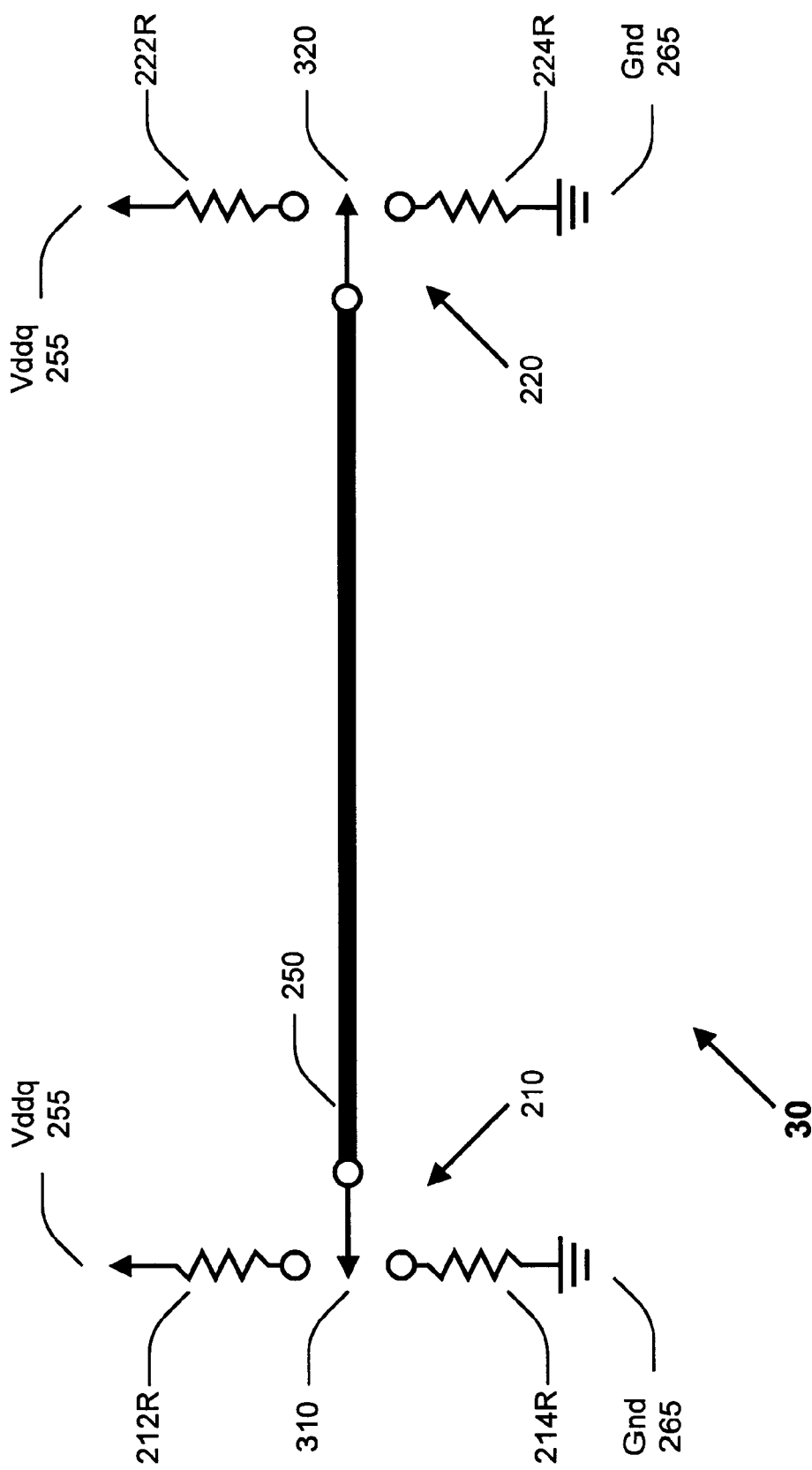
FIG. 3 illustrates an equivalent circuit diagram of the data bus having end-drivers.

FIG. 3 shows a circuit diagram of an equivalent circuit 30 of the dynamic termination logic data bus 20 of FIG. 2. The equivalent circuit 30 includes equivalent circuits of the end-drivers 210 and 220 and the data bus 250. The equivalent circuit of the end-driver 210 includes a switch 310, resistor 212R and resistor 214R. Resistor 212R is coupled between the Vddq 255 and the switch 310. Resistor 214R is coupled between the switch 310 and the Gnd 265. Switch 310 is switchable between the data bus 250 and the resistor 212R or the data bus 250 and the resistor 214R.

The equivalent circuit of the end-driver 220 includes a switch 320, resistor 222R and resistor 224R. Resistor 222R is coupled between the Vddq 255 and the switch 320. Resistor 224R is coupled between the switch 320 and the Gnd 265. Switch 320 is switchable between the data bus 250 and the resistor 222R or the data bus 250 and the resistor 224R.

In operation, the switch 310 is switchable between the resistor 212R and 214R and the switch 320 is switchable between the resistor 222R and 224R. Depending on the initial position of the switches 310 and 320, either a positive switching wave signal or a negative switching wave signal is produced when the switch 310 or switch 320 is switched from one position to another. As a switching wave signal travels through the data bus 250, the receiving end-driver terminates the received switching wave signal with a resistance which matches the characteristic impedance of the data bus 250 regardless of its switching position. In other words, the end-drivers 210 and 220 provide dynamic termination logic to the data bus 250 because independent of the switching positions of the end-drivers 210 and 220, the resistors 212R, 214R, 222R, and 224R each provide a resistance that corresponds to the characteristic impedance of the data bus 250 and properly terminates the received switching wave signal. According to the present invention, the characteristic impedance of the data bus 250 and the resistance of the resistors 212R, 214R, 222R, and 224R are each 50Ω.

Figure 4:
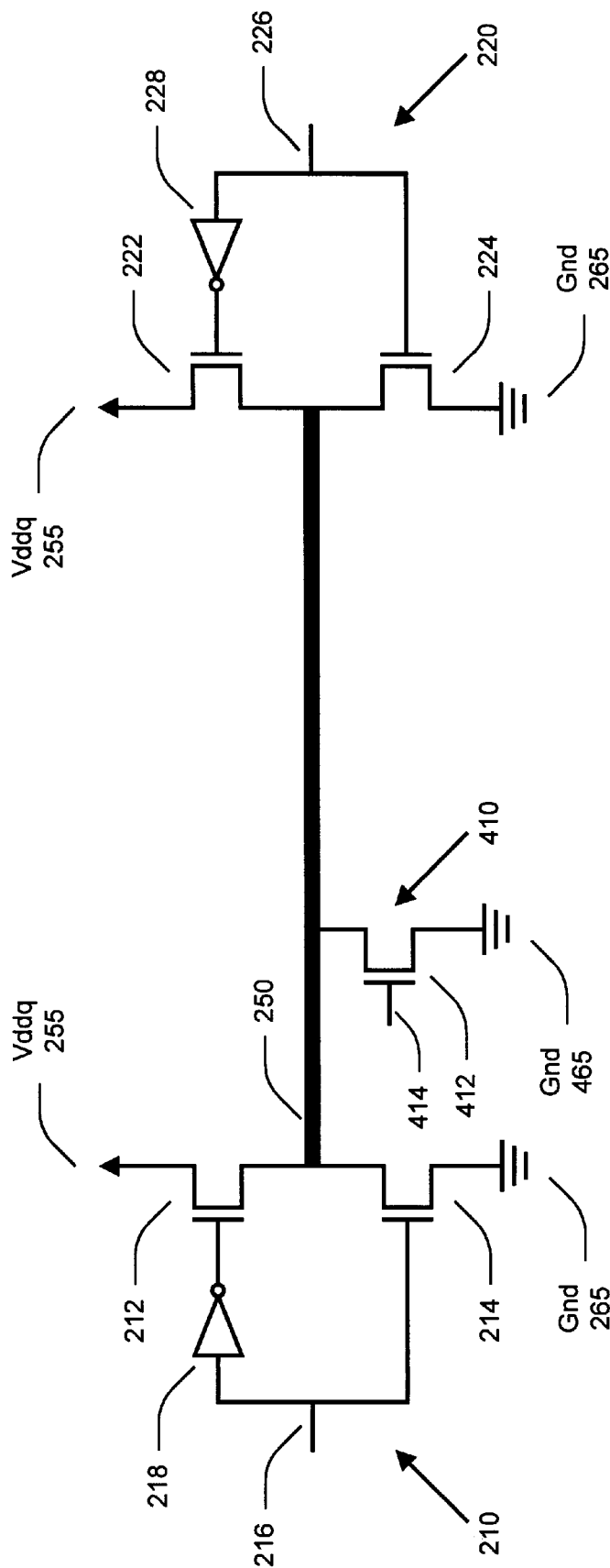
FIG. 4 illustrates a circuit diagram of a data bus having a mid-driver.

FIG. 4 shows a circuit diagram of the dynamic termination logic data bus 20 having a mid-driver 410. The mid-driver 410 provides multiple load configurations having more than two drivers for the data bus 250. One or more mid-drivers 410 can be coupled to the data bus 250 depending on the design of the data bus 250. The impedance of the mid-driver 410 equals to one half of the characteristic impedance of the data bus 250. The present embodiment provides that the mid-driver 410 consists of an open drain transistor 412. The drain of transistor 412 is coupled to the data bus 250, and the source of the transistor 412 is coupled to Gnd 465. Control signal 414 coupled to the gate of transistor 412 activates the mid-driver 410 and provides a switching function that couples the data bus 250 to Gnd 465 via the transistor 412.

In the present embodiment, the resistance of the transistor 412 of the mid-driver 410 is configured to 25Ω, Vddq is set to 1.5 volts. Activating the mid-driver 410 drives the data bus 250 to approximately 0.75 volts when the end-drivers 210 and 220 are deactivated. Since the transistors 212 and 222 of the deactivated drivers 210 and 220 are each configured to 50Ω and placed in parallel, the resulting equivalent circuit provides a voltage divider setting the data bus 250 at 0.75 volts.

Initially, when the mid-driver 410 and the end-drivers 210 and 220 are inactive, the data bus 250 is at the Vddq 255 voltage. As the mid-driver 410 becomes active and connects the data bus 250 to Gnd 465 via the transistor 412, the negative switching wave signal which is generated travels down the data bus 250 and terminates at the receiving end-drivers 210 and 220. The data bus 250 settles at the ½ Vddq voltage of a low logic state and no reflections from the negative switching wave signal result.

As multiple mid-drivers 410 are placed on the data bus 250, instances occur when two mid-drivers 410 switch back to back. Switching wave signals which are generated from the back to back switching of opposing mid-drivers 412 produce wire-or glitching. The switching wave signals are reflected back to each mid-drivers 412 because the mid-drivers 412 do not properly terminate the switching wave signals. However, as the reflected switching wave signals reach the end-drivers 210 and 220, the end-drivers 210 and 220 terminate the reflected switching wave signals to settle the data bus 250.

Figure 5:
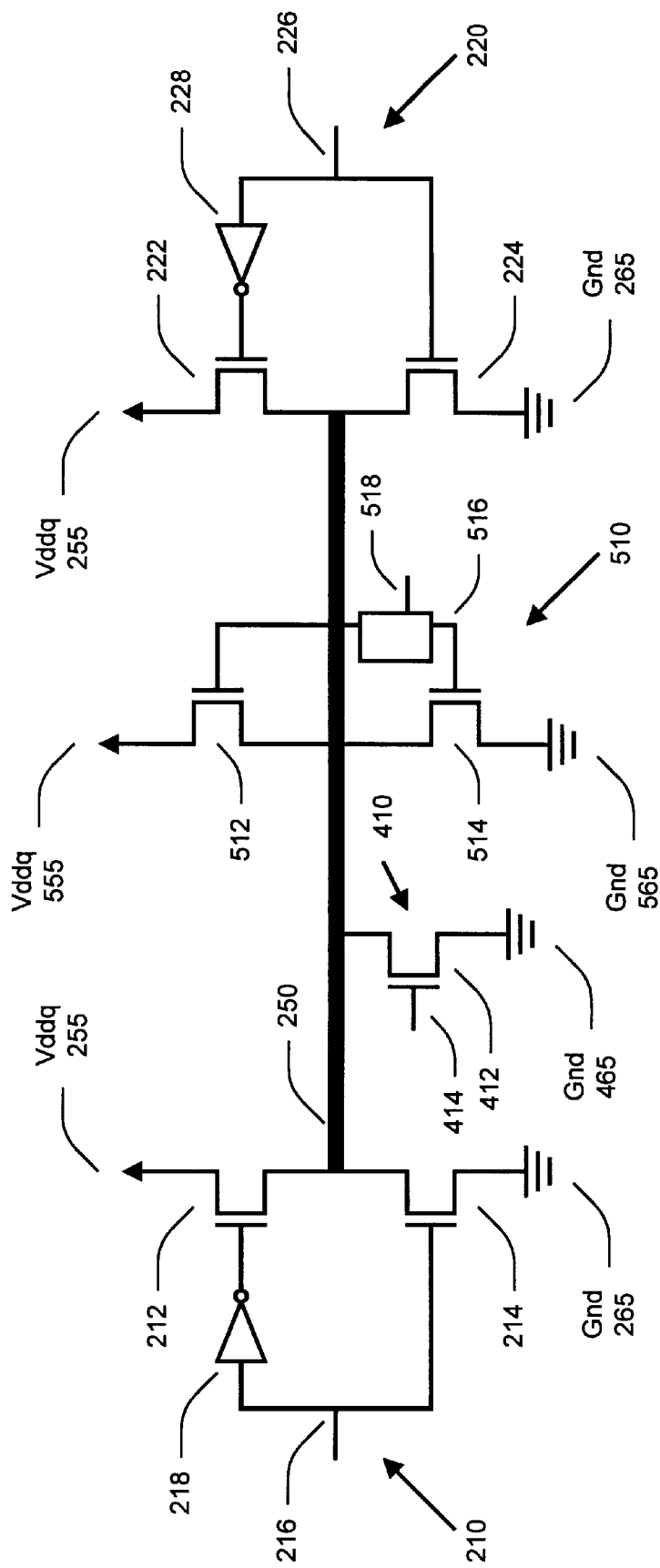
FIG. 5 illustrates a circuit diagram of a data bus having an alternative embodiment of the mid-driver.

FIG. 5 shows a circuit diagram of the dynamic termination logic data bus 20 having an alternative embodiment with mid-driver 510. The mid-driver 510 provides multiple load configuration for the data bus 20 having more than two drivers. One or more mid-drivers 510 can be coupled to the data bus 250 depending on the design of the data bus 250. The mid-driver 510 includes a transistor 512, transistor 514, and control logic 516. The drain of transistor 512 is coupled to Vddq 555, and the source of transistor 512 is coupled to the data bus 250 and the drain of transistor 514. The source of transistor 514 is coupled to Gnd 565. The gates of transistor 512 and 514 are coupled to control logic 516.

Control logic 516 receives a control signal 518 to control the mid-driver 510. The mid-driver 510 provides three mode of operation: 1) tri-stated mode when mid-driver 510 is in receiving mode, 2) drive Vddq voltage mode when transistor 512 is active and transistor 514 is inactive, and 3) drive ½ Vddq voltage mode (logic low) when transistor 512 is inactive and transistor 514 is active. In the present embodiment, transistor 512 is configured to provide 50Ω resistance from Vddq 555 to data bus 250 when active, and transistor 514 is configured to provide 25Ω resistance from data bus 250 to Gnd 565 when active.

While the foregoing detailed description has described embodiments of the apparatus and methods for dynamic termination logic of bi-directional data buses in accordance with this invention, it is to be understood that the above description is illustrative only and not limiting of the disclosed invention. Obviously, many modifications and variations will be apparent to the practitioners skilled in this art. Accordingly, the apparatus and methods for dynamic termination logic of bi-directional data buses have been provided. The dynamic termination logic reduces data bus settling time and affords increases in data bus performance. In certain instances, the data bus settling time is reduced to zero. As the dynamic termination logic settles the data bus, other data bus drivers coupled to the data bus are able to drive the data bus with their data signal. Given that data buses couples devices together so that the devices operate as a unit, increasing data bus throughputs remove bottle necks that often limit the performance of a system. The system may be of the microchip level, the component level, the system level, or the network level. Thus, the dynamic termination logic increases performance of systems that rely on data buses for informational transfers of electrical communication signals.

What is claimed is:

1. A bi-directional data bus having a characteristic impedance, comprising:

a first end-driver coupled to a first end of the data bus configured to drive the first end of the data bus with a first signal;

a second end-driver coupled to a second end of the data bus configured to dynamically terminate the first signal from the first end-driver;

a single pull-up transistor within the second end-driver, coupled between an output terminal of the second end-driver and a high voltage;

wherein an impedance of the single pull-up transistor by itself, and not in combination with other circuit elements, substantially matches the characteristic impedance; and a single pull-down transistor within the second end-driver, coupled between the output terminal of the second end-driver and ground;

wherein an impedance of the single pull-down transistor by itself, and not in combination with other circuit elements, substantially matches the characteristic impedance.

2. The bi-directional data bus of claim 1, wherein the second end-driver drives the data bus with a second signal and the first end-driver dynamically terminates the second signal for the second end-driver, and wherein the first end-driver includes:

a second single pull-up transistor coupled between an output terminal of the first end-driver and the high voltage;

wherein an impedance of the second single pull-up transistor by itself, and not in combination with other circuit elements, substantially matches the characteristic impedance; and a second single pull-down transistor coupled between the output terminal of the first end-driver and ground;

wherein an impedance of the second single pull-down transistor by itself, and not in combination with other circuit elements, substantially matches the characteristic impedance.

3. The bi-directional data bus of claim 2, wherein the first end-driver and the second end-driver simultaneously dynamically terminate the first and the second signals.

4. The bi-directional data bus of claim 1 further comprising a first mid-driver coupled to the data bus configured to drive the data bus with a third signal and wherein the first end-driver dynamically terminates the third signal.

5. The bi-directional data bus of claim 4, wherein the second end-driver dynamically terminates the third signal.

6. The bi-directional data bus of claim 4, wherein the first end-driver dynamically terminates a reflection of the first signal from the first mid-driver.

7. The bi-directional data bus of claim 4 further comprising a second mid-driver coupled to the data bus configured to drive the data bus with a fourth signal and wherein the second end-driver dynamically terminates a reflection of the fourth signal from the first mid-driver.

8. The bi-directional data bus of claim 7, wherein the first end-driver dynamically terminates a reflection of the third signal from the second mid-driver.

9. A wire-or data bus having a characteristic impedance for transmitting data signals, comprising:
- a first driver coupled to a first end of the data bus having a single pull-up transistor and a single pull-down transistor, the single pull-up transistor being coupled between an output terminal of the first driver and a high voltage, the single pull-down transistor being coupled between an output terminal of the first driver and ground;
- wherein an impedance of the single pull-up transistor by itself, and not in combination with other circuit elements, substantially matches the characteristic impedance;
- wherein an impedance of the single pull-down transistor by itself, and not in combination with other circuit elements, substantially matches the characteristic impedance; and
- a second driver coupled to a second end of the data bus having a second single pull-up transistor and a second single pull-down transistor, the second single pull-up transistor being coupled between an output terminal of the second driver and a high voltage, the second single pull-down transistor being coupled between an output terminal of the second driver and ground;
- wherein an impedance of the second single pull-up transistor by itself, and not in combination with other circuit elements, substantially matches the characteristic impedance;
- wherein an impedance of the second single pull-down transistor by itself, and not in combination with other circuit elements, substantially matches the characteristic impedance.

10. The wire-or data bus of claim 9, wherein:
- the first driver includes resources which switches between activating the pull-up transistor and the pull-down transistor for transmitting a first signal to the data bus; and
- the second driver includes resources which switches between activating the pull-up transistor and the pull-down transistor for transmitting a second signal to the data bus.

11. The wire-or data bus of claim 9, wherein:
- the first driver dynamically terminates received signals from the data bus to prevent ringing; and
- the second driver dynamically terminates received signals from the data bus to prevent ringing.

12. The wire-or data bus of claim 11 further comprising a mid-driver coupled to the data bus between the first driver and the second driver configured to generate a mid-driver signal to the data bus and wherein the first driver and the second driver dynamically terminate signals from the mid-driver to prevent ringing.

13. The wire-or data bus of claim 12 further comprising a second mid-driver coupled to the data bus between the mid-driver and the second driver configured to generate a second mid-driver signal to the data bus and wherein the first driver and the second driver dynamically terminate signals from the mid-driver and the second mid-driver to prevent ringing.

14. The wire-or data bus of claim 12, wherein the mid-driver includes a pull-down transistor coupled between the data bus and ground and the second mid-driver includes a pull-down transistor coupled between the data bus and ground.

15. The wire-or data bus of claim 14, wherein the mid-driver includes a pull-up transistor coupled between the data bus and power and the second mid-driver includes a pull-up transistor coupled between the data bus and power for generating a rising pulse on the data bus.

16. A computer system having a bi-directional data bus for transferring data between a first computer and a second computer, comprising:
- a first end-driver coupled to a first end of the data bus of the first computer configured to drive the first end of the data bus with a first signal; and
- a second end-driver coupled to a second end of the data bus of the second computer configured to dynamically terminate the first signal from the first end-driver;
- a single pull-up transistor within the second end-driver coupled between an output terminal of the second end-driver and a high voltage;
- wherein an impedance of the single pull-up transistor by itself, and not in combination with other circuit elements, substantially matches the characteristic impedance; and
- a single pull-down transistor within the second end-driver coupled between the output terminal of the second end-driver and ground;
- wherein an impedance of the single pull-down transistor by itself, and not in combination with other circuit elements, substantially matches the characteristic impedance.

17. The computer system of claim 16, wherein the second end-driver drives the data bus with a second signal and the first end-driver dynamically terminates the second signal for the second end-driver, and wherein the first end-driver includes:
- a second single pull-up transistor coupled between an output terminal of the first end-driver and the high voltage;
- wherein an impedance of the second single pull-up transistor by itself, and not in combination with other circuit elements, substantially matches the characteristic impedance; and
- a second single pull-down transistor coupled between the output terminal of the first end-driver and ground;
- wherein an impedance of the second single pull-down transistor by itself, and not in combination with other circuit elements, substantially matches the characteristic impedance.

18. The computer system of claim 17, wherein the first end-driver and the second end-driver simultaneously dynamically terminate the first and the second signals.

19. The computer system of claim 16 further comprising a first mid-driver coupled between the first end and the second end of the data bus configured to drive the data bus with a third signal and wherein the first end-driver and the second end-driver dynamically terminates the third signal.

20. The computer system of claim 19 further comprising a second mid-driver coupled between the first mid-driver and the second end of the data bus configured to drive the data bus with a fourth signal and wherein the first end-driver and the second end-driver dynamically terminate the third signal and the fourth signal.

* * * * *